United States Patent [19]

Hamamura et al.

[11] Patent Number: 5,165,286
[45] Date of Patent: Nov. 24, 1992

[54] STRAIN DETECTOR

[75] Inventors: Tiyo Hamamura; Keiitiro Kobayashi; Hideo Ikeda; Katsuhiko Honda; Yoshiyasu Ogata; Naoki Yagi, all of Amagasaki, Japan

[73] Assignee: Mitsubishi Denki Kabushiki Kaisha, Tokyo, Japan

[21] Appl. No.: 720,991

[22] Filed: Jun. 27, 1991

[30] Foreign Application Priority Data

Jun. 29, 1990 [JP] Japan .................. 2-169885
Aug. 8, 1990 [JP] Japan .................. 2-211206

[51] Int. Cl.$^5$ .............................. G01B 7/02
[52] U.S. Cl. ...................... 73/779; 73/862.335
[58] Field of Search .......... 73/779, DIG. 2, 862.36; 324/209; 335/214

[56] References Cited

U.S. PATENT DOCUMENTS

| | | | |
|---|---|---|---|
| 4,414,855 | 11/1983 | Iwasaki | 73/862.36 |
| 4,543,197 | 9/1985 | Karasawa et al. | 252/62.55 X |
| 4,760,745 | 8/1988 | Garshelis | 73/862.36 |

FOREIGN PATENT DOCUMENTS

| | | |
|---|---|---|
| 9034 | 3/1983 | Japan . |
| 102427 | 4/1990 | Japan .................. 73/862.36 |

OTHER PUBLICATIONS

IEEE Transactions on Magnetics, vol. MAG-20, No. 5, Sep. 1984, pp. 951-953.

Primary Examiner—Jerry W. Myracle
Attorney, Agent, or Firm—Sughrue, Mion, Zinn, Macpeak and Seas

[57] ABSTRACT

A strain detector in which a pair of magnetic layer patterns (5, 6) made of a magnetically permeable soft magnetic material are attached to a driven shaft (1) and a pair of detection coils (8, 9) are disposed to surround the respective magnetic layers for detecting a change in magnetic permeability of the magnetic layers which is caused when an external force is applied to the driven shaft. A magnetic yoke (15 or 16) is disposed around each of the detection coils (8 or 9) for promoting the passage of the magnetic flux therethrough, thereby decreasing flux leakage. The magnetic yokes (15, 16) each comprises an axially extending tubular member (15a) and radially inward outer and inner flanges (15d, 15e) extending from axially outer and inner ends of the tubular member, respectively. The magnetic yokes each may be made of a compacted core material containing magnetic powder and binder or assembled from a plurality of parts. A highly electrically-conductive, nonmagnetic material (23) may be disposed directly between the inner ends (21b) of the tubular member (21a) of the magnetic yokes (21) and the detection coils (8, 9) for magnetically isolating them without the need for any inner flange while allowing a compact structure.

7 Claims, 7 Drawing Sheets

STRAIN DETECTOR

BACKGROUND OF THE INVENTION

This invention relates to a strain detector and, more particularly, to a strain detector for detecting a strain on a driven shaft such as a rotary shaft generated when an external force is applied.

FIG. 13 illustrates an example of a conventional strain detector in which reference numeral 1 designates a driven shaft, and 2 designates its central axis. Reference numerals 3 and 4 designate bearings for the driven shaft 1, 5 and 6 are magnetic layers attached to an outer circumferential surface of the driven shaft 1 at angles of +45° and −45° and made of a highly permeable, soft magnetic material having a predetermined suitable magnetostrictive constant, 7 designates a coil bobbin supported by the bearings 3 and 4 around the driven shaft 1, 8 and 9 are detection coils wound around the coil bobbin 7 corresponding to the magnetic layers 5 and 6, respectively, 10 and 11 are magnetic yokes made of a highly magnetically permeable, soft magnetic material such as an amorphous alloy or a silicon steel sheet and disposed on an outer circumference of the detection coils 8 and 9, and 12 designates a non-magnetic shield made of a non-magnetic, highly electrically conducive material such as Cu and Al and disposed around the yokes 10 and 11 in common. The reference numeral 13 designates a magnetic shield disposed around the non-magnetic shield 12. The magnetic shield 13 is made of a highly magnetically permeable, soft magnetic material such as an amorphous alloy or a silicon steel sheet. A detection circuit 14 is connected to the detection coils 8 and 9.

When an external torque is applied to the driven shaft 1, a tensile stress is generated in one of the magnetic layers 5 and 6 and a compression stress is generated in the other of the magnetic layers 5 and 6, whereupon a strain is generated in each layer. This strain causes a re-arrangement of magnetic domains in the magnetic layers as a result of magnetostriction phenomenon, which in turn causes a change in magnetic permeability of the magnetic layers. At this time, the permeability varies in opposite directions depending upon the tensile stress or the compression stress. The detection coils 8 and 9 detect this change in magnetic permeability as a change in magnetic impedance and supply their outputs to the detection circuit 14, where a detection voltage V indicative of a magnitude of the torque applied on the driven shaft 1 is provided.

The magnetic yokes 10 and 11 are for concentrating the magnetic fluxes generated from the detection coils 8 and 9 in the magnetic layers 5 and 6 to flow therethrough and to prevent the leakage of the magnetic flux, thereby to increase the sensitivity. The non-magnetic shield 12 is made of a non-magnetic, high electrical conductivity material, so that the alternating magnetic flux appears only in a very shallow skin region of the material, whereby a magnetic flux generated by the detection coil and an external a.c. magnetic flux are magnetically isolated by the non-magnetic shield 12. Therefore, the leakage of the magnetic flux generated by the coil is prevented, whereby the sensitivity is increased, and the undesirable ingress of the external a.c. magnetic flux is prevented so that the noise immunity is improved. Also, the magnetic shield 13 is made of a highly magnetically permeable, soft magnetic material, so that the ingress of an external d.c. magnetic field to the magnetic layers 5 and 6 is prevented.

In the above arrangement, the yokes 10 and 11 which are made of a high permeability soft magnetic material such as an amorphous alloy or a silicon steel sheet are disposed around the detection coils 8 and 9 for concentrating the magnetic flux generated from the detection coils 8 and 9 to flow through the magnetic layers 5 and 6, thereby to preventing the flux leakage and increasing the sensitivity.

However, the magnetic yokes are simple tubular members, so that the function of concentrating the magnetic flux in the magnetic layers 5 and 6 is not sufficient for completely eliminating the leakage of the magnetic flux to the bearings 3 and 4, whereby the sensitivity of the strain detector is degraded. Also, some portion of the magnetic flux generated from the detection coils 8 and 9 reaches to the other detection coil. As a result, errors in the detection torque are increased.

SUMMARY OF THE INVENTION

Accordingly, an object of the present invention is to provide a strain detector free from the above-discussed problems.

Another object of the present invention is to provide a strain detector which is highly sensitive and accurate.

Another object of the present invention is to provide a strain detector which is compact and inexpensive.

Still another object of the present invention is to provide a strain detector which is easy to assemble.

with the above objects in view, the strain detector of the present invention comprises a driven shaft to which an external force is applied. A pair of magnetic layer patterns made of a highly magnetically permeable soft magnetic material having a predetermined magnetostriction constant are attached to the driven shaft. In order to detect a change in magnetic permeability of the magnetic layers which is caused when an external force is applied to the driven shaft, a pair of detection coils are disposed in an axially spaced apart relationship relative to one another and surrounding the magnetic layers in a concentric relationship with respect to the driven shaft. A substantially tubular magnetic yoke is concentrically disposed around each of the detection coils for promoting the passage of magnetic flux therethrough and decreasing flux leakage. Each of the magnetic yokes comprises an axially extending tubular member, an outer flange extending radially inwardly from an axially outer end of the magnetic yoke and an inner flange extending radially inwardly from an axially inner end of the magnetic yoke.

Alternatively, a highly electrically-conductive, non-magnetic central shield may be disposed directly between the inner ends of the tubular member of the magnetic yokes and the detection coils for a more compact structure, without the need for providing an inner flange.

An axial dimension of an inner edge of the non-magnetic shield may be equal to or smaller than an axial dimension by which the pair of magnetic layer patterns are separated. An axial dimension of each of the detection coils may be equal to or smaller than an axial dimension of each of the magnetic layer patterns.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
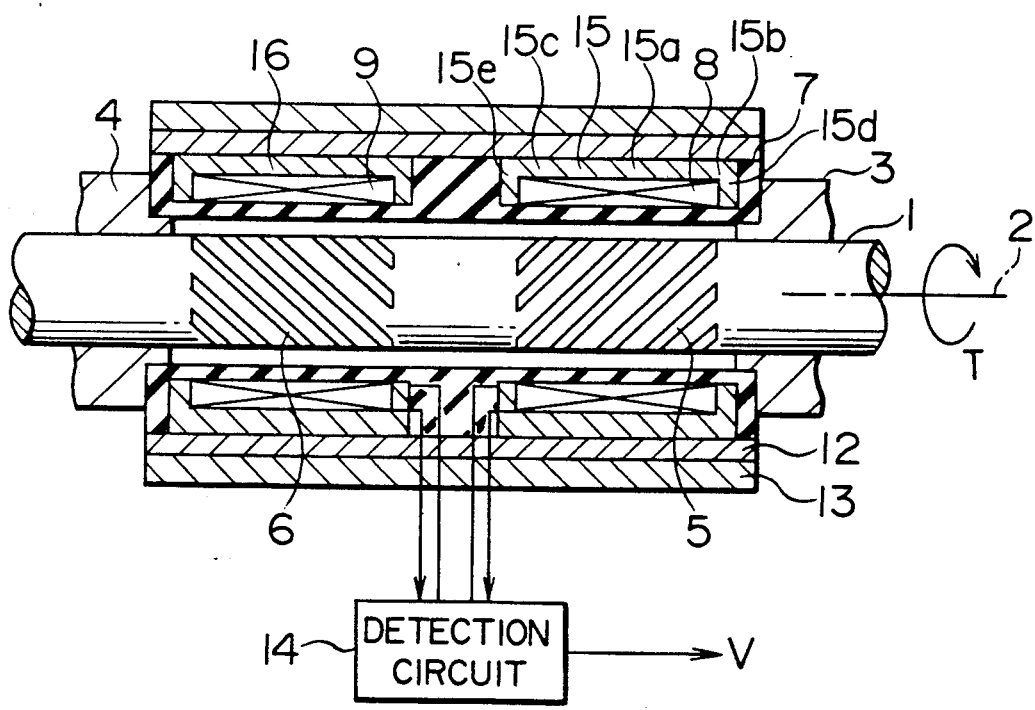
FIG. 1 is an axial sectional view of the strain detection of the present invention.

FIG. 1 illustrates an embodiment of a strain detector of the present invention, from which it is seen that the strain detector of the present invention comprises a driven shaft 1 to which an external force or torque T is applied about its central axis 2. A pair of magnetic layer patterns 5 and 6 well known in the art as a chevron are attached to an outer circumferential surface of the driven shaft 1. A magnetic layer patterns 5 and 6 are made of a highly magnetically permeable soft magnetic material having a predetermined magnetostriction constant.

A substantially tubular coil bobbin 7 is coaxially mounted to the driven shaft 1 through a pair of bearings 3 and 4 and supports a pair of detection coils 8 and 9 would in circumferential grooves formed in the coil bobbin. The detection coils 8 and 9 are disposed in an axially spaced apart relationship relative to one another and surrounding the magnetic layers 5 and 6 in a concentric relationship with respect to the driven shaft 1 for detecting a change in magnetic permeability of the magnetic layers 5 and 6 caused when an external force is applied to the driven shaft 1.

The strain detector of the present invention further comprises substantially tubular magnetic yokes 15 and 16 concentrically disposed around the detection coils 8 and 9, respectively, for promoting the passage of magnetic flux therethrough thereby to decrease flux leakage. The magnetic yoke 15 comprises an axially extending tubular member 15a having an axially outer end 15b and an axially inner end 15c, an outer flange 15d extending radially inwardly from the outer end 15b of the tubular member 15a and an inner flange 15e extending radially inwardly from the inner end 15c of the tubular member 15a so that a substantially U-shaped radial cross-section is provided. As apparent from the figure, the magnetic yoke 16 has a similar structure. The magnetic yokes 15 and 16 are made of a soft magnetic material manufactured by a powder metallurgical process and may be a ferrite magnetic core of Ni-Zn-Cu. The magnetic yokes 15 and 16 may equally be a ferrite core of N-Zn or a powder-compacted core containing magnetic powder and a binder, or a core made of a sheet of steel.

Figure 2:
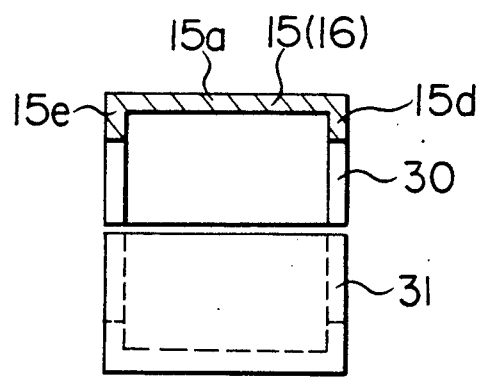
FIG. 2 is a side view illustrating an example of the magnetic yoke of the strain detector illustrating another magnetic yoke of the present invention.
Figure 3:
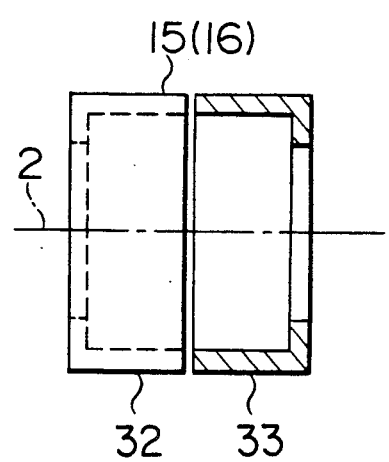
Figure 4:
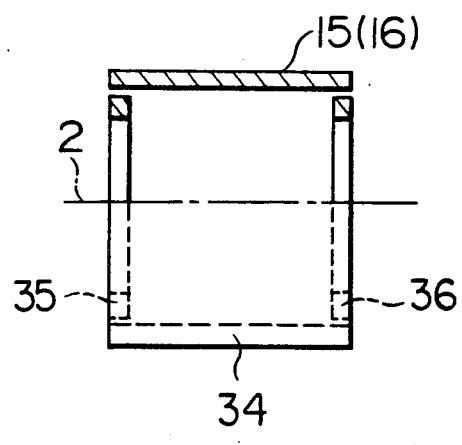
FIG. 4 is a side view illustrating a still another modification of the magnetic yoke of the strain detector of the present invention.

As best shown in FIGS. 2 to 4, in which only one magnetic yoke 15 of the pair of magnetic yokes 15 and 16 is illustrated because they are similar to each other in structure, the magnetic yoke 15 may be composed of a plurality of parts differing from the integral magnetic yoke 15 illustrated in FIG. 1. These structures allow easy manufacture of the magnetic yoke 15 and easy assembly onto the detection coils 8 and 9. The magnetic yoke 15 illustrated in FIG. 2 comprises two halves 30 and 31 divided along a plane containing the central axis of the magnetic yoke 15, and the magnetic yoke 15 illustrated in FIG. 3 comprises two equal halves 32 and 33 centrally divided along a plane perpendicular to the central axis 2 of the shaft 1. The magnetic yoke 15 illustrated in FIG. 4 comprises a tubular member 34 and two flanges 35 and 36 having an outside diameter about equal to the inside diameter of the tubular member 34.

The outer circumferential surface of the coil bobbin 7 and the magnetic yokes 15 and 16 are surrounded by a tubular non-magnetic shield 12 of a high electric conductivity material and a magnetic shield 13 of a highly permeable soft magnetic material.

According to the present invention, since the magnetic yokes 15 and 16 have a generally U-shaped cross section and surround the detection coils 8 and 9, the magnetic fluxes generated from the detection coils 8 and 9 are concentrated on the magnetic layers 5 and 6 to flow therethrough, thereby minimizing the magnetic leakage. Therefore, the magnetic fluxes generated by the detection coils 8 and 9 can be efficiently exerted upon the magnetic layers 5 and 6, improving the sensitivity of the strain detector. Also, since the magnetic yokes 15 and 16 include the flange portions 15d and 15e or 16d and 16e, the magnetic flux interacting between the detection coils 8 and 9 can be minimized, thereby to increase the accuracy of the strain detector.

Figure 5:
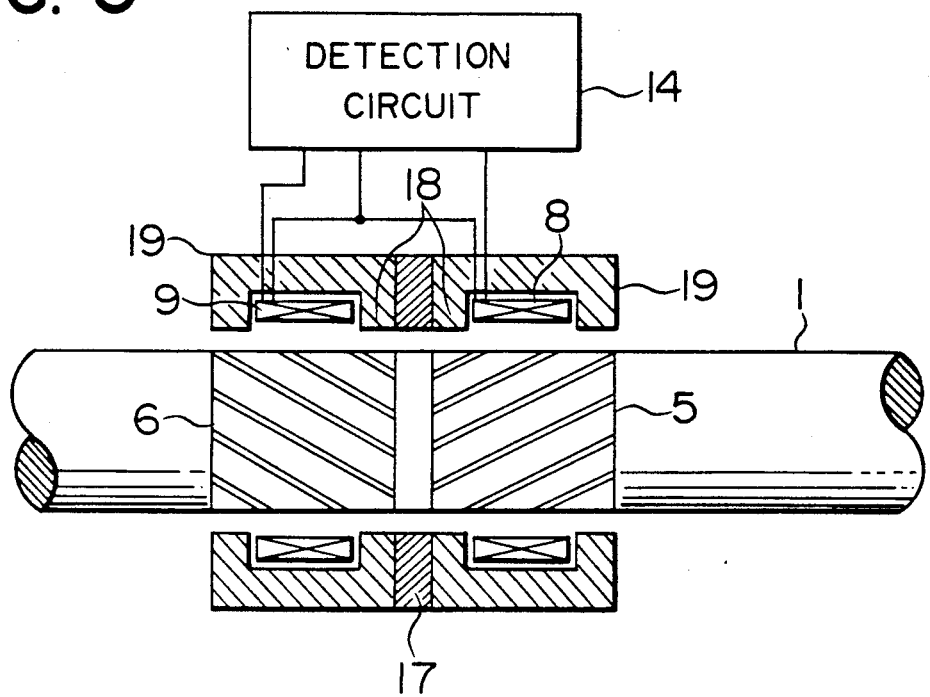
FIG. 5 is a schematic axial sectional view of another example of the strain detector.

FIG. 5 illustrates, in a schematic sectional view, another example of a strain detector in which a non-magnetic material 17 such as plastic is disposed between the inner flanges 18 of substantially U-shaped magnetic yokes 19. This arrangement with the U-shaped magnetic yokes 19 is advantageous in that the flanges 18 of the magnetic yokes 19 are effective for flux concentration and minimizing the flux leakage. However, when the same sectional area of the detection coils 8 and 9 is to be maintained, the overall dimensions of the assembly of the coils 8 and 9 and the magnetic yokes 19 become large and when the outer dimensions of the coil assembly must not be increased, the sectional area of the detection coils 8 and 9 must be made small, decreasing the magnetomotive force of the magnetic circuit and degrading the output characteristics of the strain detector.

Figure 6:
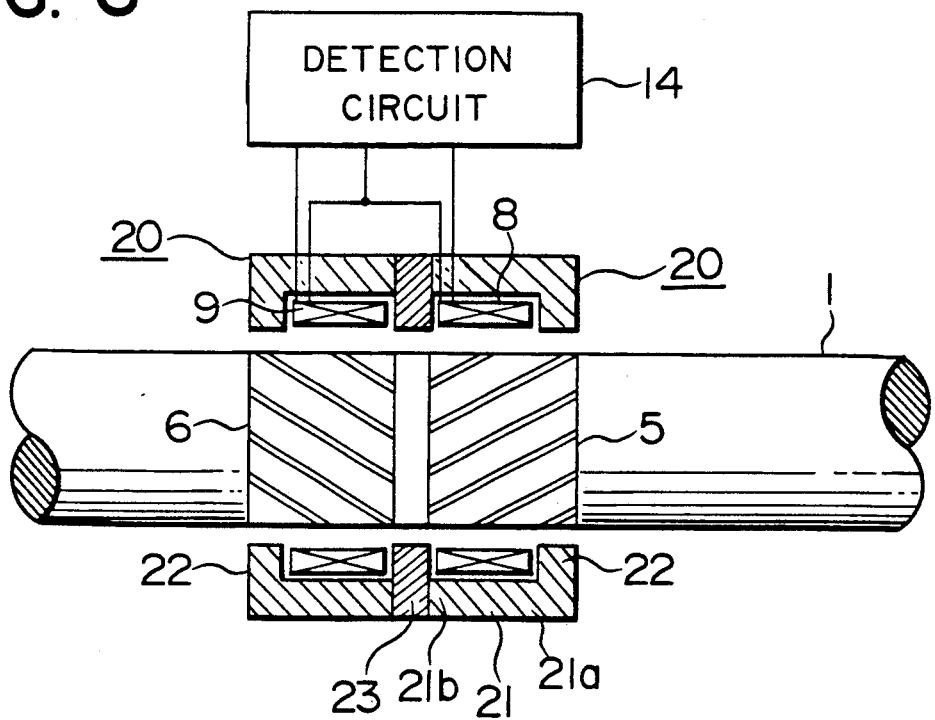
FIG. 6 is an axial sectional view illustrating a further modification of the strain detector of the present invention.
Figure 7:
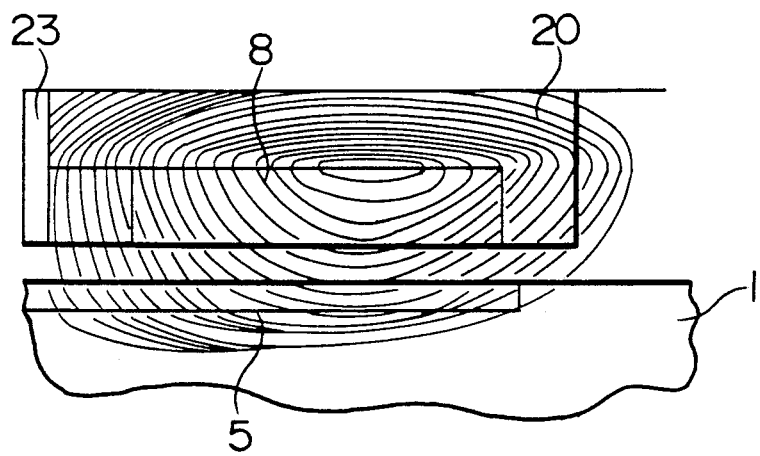
FIG. 7 is a fragmental sectional view illustrating the manner in which the magnetic fluxes pass through the magnetic layers under the influence of the magnetic yoke and the central shield of the present invention.

FIG. 6 illustrates another embodiment of the strain detector of the present invention in which it is seen that each of the magnetic yokes 20 has an axially extending tubular member 21 having an axially outer end 21a and an axially inner end 21b and an outer flange 22 extending radially inwardly from the axially outer end 21a of the magnetic yoke 20. Thus, the magnetic yokes 20 of this embodiment have a substantially L-shaped axial cross section. It is also seen that a highly electrically-conductive, non-magnetic center shield 23 is disposed between the inner ends 21b of the tubular member 21 of the magnetic yokes 20. The non-magnetic center shield 23 is a substantially ring-shaped member raid ally inwardly extending and is directly adjacent to the inner ends 21b as well as the detection coils 8 and 9 for magnetically isolating them.

In this embodiment, since the center shield 23 of a conductive non-magnetic material is disposed between the magnetic yokes 20 and the detections coils 8 and 9, the magnetic paths for the magnetic fields generated by the detection coils 8 and 9 are completely isolated into two systems due to the skin effect of the center shield 23, so that the magnetic fluxes from the detection coils 8 and 9 are controlled not to spread in the axial direction. Therefore, the magnetic fluxes generated by the detection coils 8 and 9 are regulated to concentrate and flow in the magnetic layer patterns 5 and 6 on the driven shaft 1 by the outer flanges 22 on one hand and by the center shield 23 on the other hand as concentrated in the magnetic layer pattern 5 by the magnetic yoke 20 and the non-magnetic center shield 23.

Since the magnetic yokes 20 have the substantially L-shaped cross section and has only outer flange 22, the coil assembly of the detection coils 8 and 9 and the magnetic yokes 20 as well as the center shield 23 can be made smaller in the axial length dimension by the thickness of the otherwise necessary inner flanges. Also, the detection coils 8 and 9 can be easily assembled with the magnetic yokes 20, whereby the manufacturing cost can be decreased.

Figure 8:
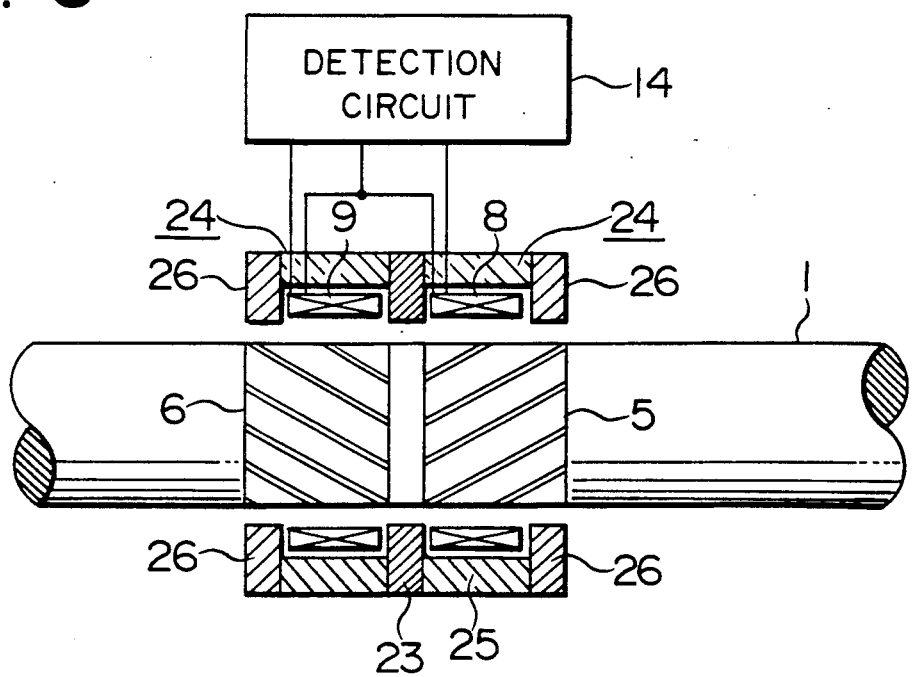
FIG. 8 is a sectional side view illustrating another modification of the strain detector of the present invention.

In FIG. 8, which illustrates another embodiment of the present invention, the magnetic yokes 24 comprise a tubular member 25 and a separate outer flange 26 attached to the tubular member 25. In this embodiment, the assembly of the magnetic yokes 24 on the detection coils 8 and 9 can be very easily achieved.

Figure 9:
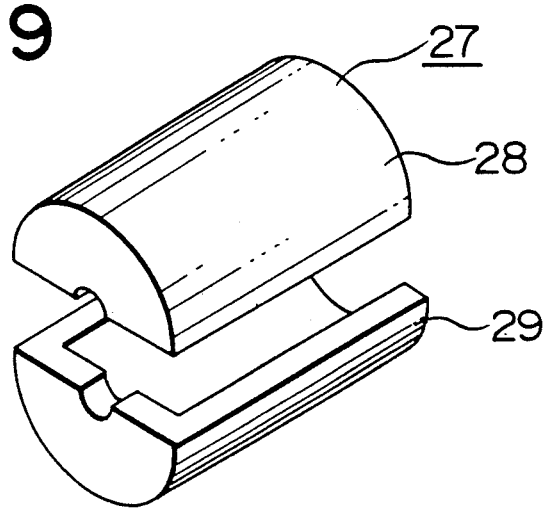
FIG. 9 is a perspective view illustrating an example of the magnetic yoke.

FIG. 9 illustrates in a perspective view another embodiment of a magnetic yoke 27 of the present invention, in which the magnetic yoke 27 comprises two halves 28 and 29 divided along a plane containing the central axis of the generally tubular magnetic yoke 27. With this arrangement, the strain detector can be easily assembled.

Figure 10:
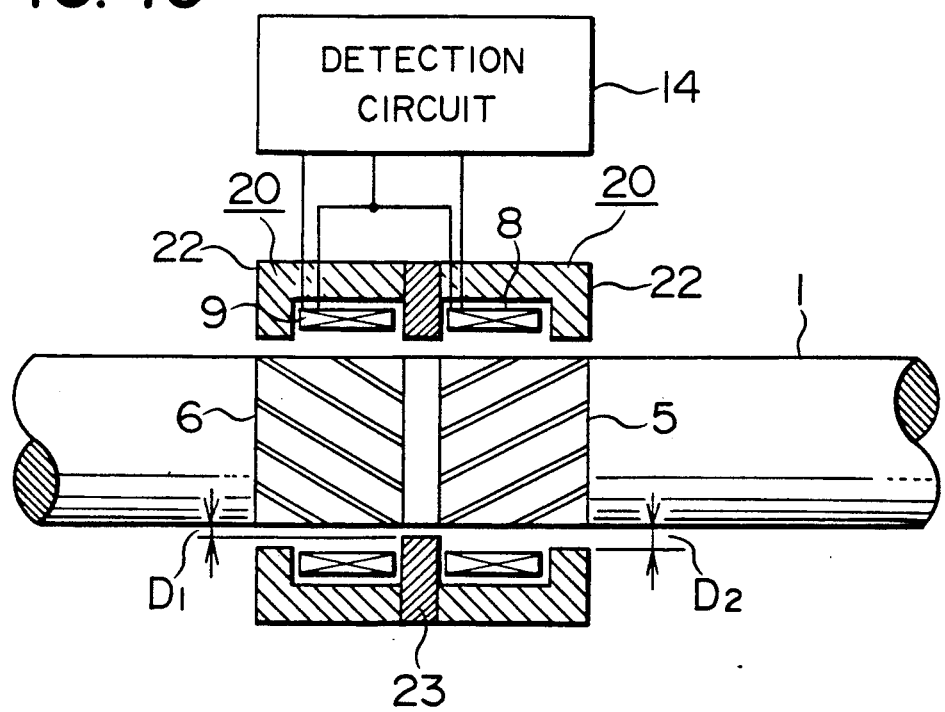
FIG. 10 is an axial sectional view illustrating the present invention for explaining the dimensional relationship between an inner diameter of the yoke and the center shield.

FIG. 10 illustrates the embodiment of the strain detector having L-shaped yokes in which a radial dimension $D_1$ of an annular gap defined between an inner edge of the non-magnetic center shield 23 and the driven shaft 1 is smaller than a radial dimension $D_2$ of an annular gap defined between an inner edge of the outer flange 22 of the magnetic yokes 20 and the driven shaft 1. The radial dimension $D_1$ may also be equal to the radial dimension $D_2$. That is, $D_1 \leq d_2$.

Figure 11:
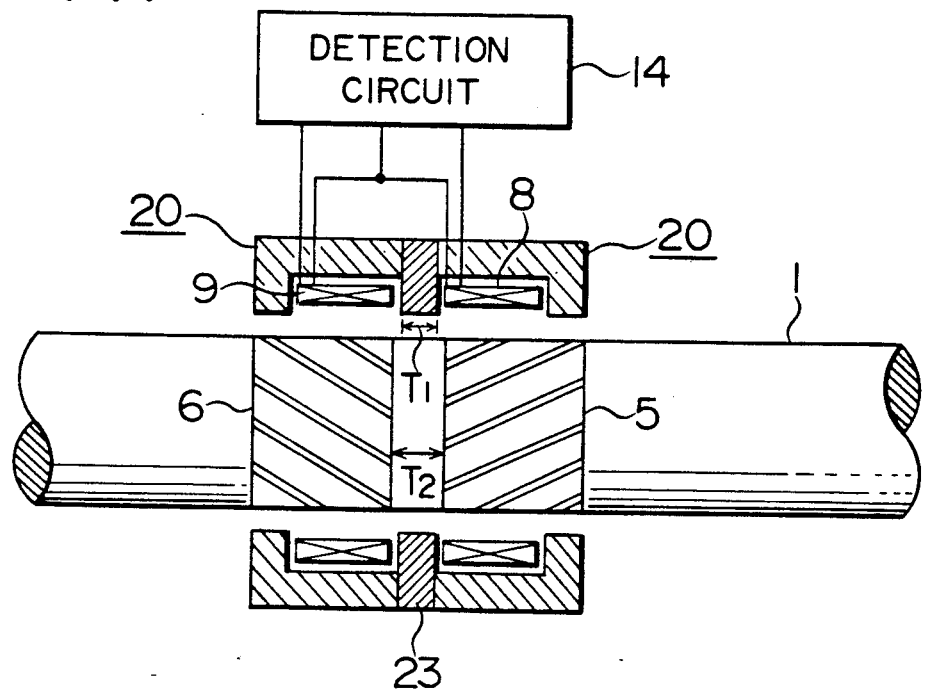
FIG. 11 is also a sectional view illustrating the present invention for explaining the dimensional relationship between a thickness of the central shield and a space of two magnetic layers.

FIG. 11 illustrates the embodiment of the strain detector having L-shaped yokes in which an axial dimension or thickness $T_1$ of the non-magnetic center shield 23 is equal to or smaller than an axial dimension $T_2$ by which the pair of magnetic layer patterns 5 and 6 are separated from each other. That is, $T_1 \leq T_2$.

Figure 12:
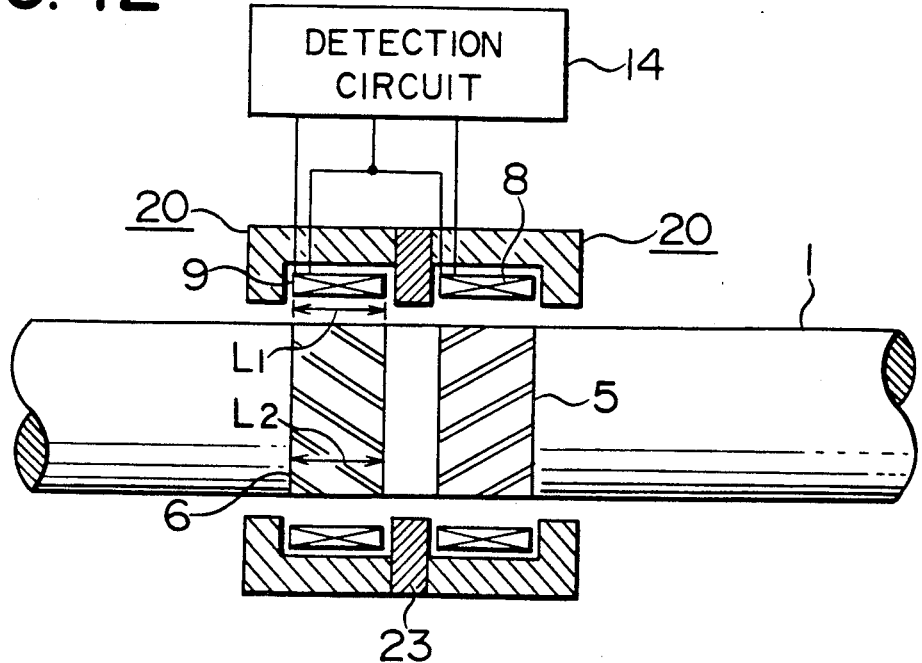
FIG. 12 is a sectional side view illustrating the present invention for explaining the dimensional relationship between the width of the coil and the length of the magnetic layer.
Figure 13:
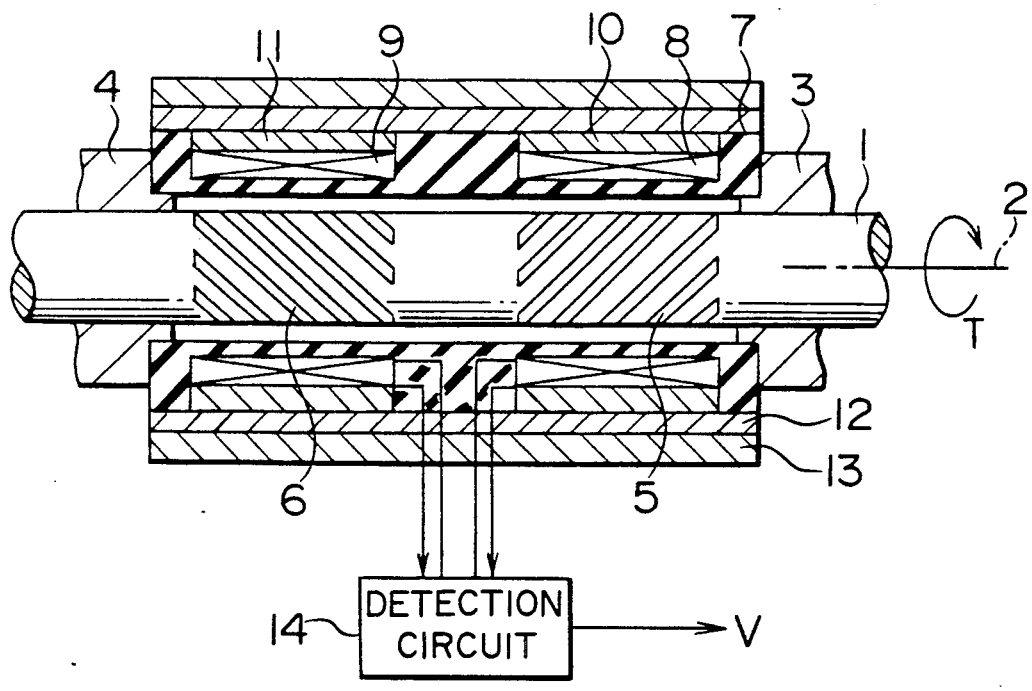
FIG. 13 is a sectional side view illustrating a conventional strain detector.

FIG. 12 illustrates the embodiment of the strain detector having L-shaped yokes in which an axial dimension $L_1$ of each of the detection coil 8 or 9 is equal to or smaller than an axial dimension $L_2$ of each of the magnetic layer patterns 5 and 6. This is, $L_1 \leq L_2$.

As has been described, the strain detector of the present invention illustrated in FIGS. 6 to 12 employes a non-magnetic, electrically conductive center shield 23 which suppresses the spreading of the magnetic fluxes in the axial direction and causes concentration of the magnetic fluxed in the magnetic pattern layers 5 and 6. Therefore, the compact magnetic yokes having the substantially L-shaped cross section including only one flange can be used together with the center shield, so that the strain detector can be made small-sized without degrading the efficiency of the detection coils and the detector characteristics. Also the strain detector can be easily manufactured at a low cost.

What is claimed is:

1. A strain detector comprising:
a driven shaft to which an external force is applied;
a pair of magnetic layer patterns attached to an outer circumferential surface of said driven shaft, said magnetic layer being made of a highly magnetically permeable soft magnetic material having a predetermined magnetostriction constant;
a pair of detection coils disposed in an axially spaced apart relationship relative to one another and surrounding said magnetic layers in a concentric relationship with respect to said driven shaft for detecting a change in magnetic permeability of said magnetic layers which is caused when an external force is applied to said driven shaft;
a substantially tubular magnetic yoke concentrically disposed around each of said detection coils for promoting the passage of magnetic flux therethrough, thereby decreasing flux leakage, said magnetic yoke having an axially extending tubular member and an outer flange extending radially inwardly from axially outer end of said magnetic yoke; and
a highly electrically-conductive, non-magnetic shield disposed between said inner ends of said magnetic yokes and said detection coils for magnetically isolating them.

2. A strain detector as claimed in claim 1, wherein said magnetic yokes are made of a ferrite magnetic material containing one of an N-Zn alloy and an Ni-Zn-Cu alloy as main ingredient.

3. A stain detector as claimed in claim 1, wherein said magnetic yokes are made of a compacted core material containing magnetic powder and binder.

4. A strain detector as claimed in claim 1, wherein said magnetic yokes each is composed of a plurality of parts assembled together.

5. A strain detector as claimed in claim 1, wherein a radial dimension of an annular gap defined between an inner edge of said non-magnetic shield and said driven shaft is equal to or smaller than a radial dimension of an annular gap defined between an inner edge of said outer flange of said magnetic yokes and said driven shaft.

6. A strain detector as claimed in claim 1, wherein an axial dimension of an inner edge of said non-magnetic shield is equal to or smaller than an axial dimension by which said pair of magnetic layer patterns are separated.

7. A strain detector as claimed in claim 1, wherein an axial dimension of each of said detection coil is equal to or smaller than an axial dimension of each of said magnetic layer patterns.

* * * * *